United States Patent [19]
Holm

[11] 3,738,320
[45] June 12, 1973

[54] AUTOMATIC MILKING BARN
[75] Inventor: William Z. Holm, Petaluma, Calif.
[73] Assignee: Ross-Holm Division, Holm Tractor & Equipment Company, Petaluma, Calif.
[22] Filed: Feb. 14, 1972
[21] Appl. No.: 226,221

Related U.S. Application Data
[60] Division of Ser. No. 62,714, Aug. 10, 1970, Pat. No. 3,699,922, which is a continuation of Ser. No. 730,818, May 21, 1968, abandoned.

[52] U.S. Cl.................... 119/14.03, 119/20, 119/27
[51] Int. Cl............................................. A01k 01/00
[58] Field of Search................... 119/14.03, 14.04, 119/16, 20, 27

[56] References Cited
UNITED STATES PATENTS
3,223,070  12/1965  Gribble et al................ 119/14.03 X
3,246,631  4/1966   Holm .............................. 119/14.03
3,282,250  11/1966  Cain................................ 119/14.04

Primary Examiner—Hugh R. Chamblee
Attorney—Naylor & Neal

[57] ABSTRACT

A herringbone milking parlor having automatic controls for preparation and movement of milking cows, stall adjusting means for accommodating cows of different size in a single herring-bone stall, and a swinging sector gate for transferring a group of cows in sequence from a group of preparation stalls to a herringbone milking stall.

5 Claims, 6 Drawing Figures

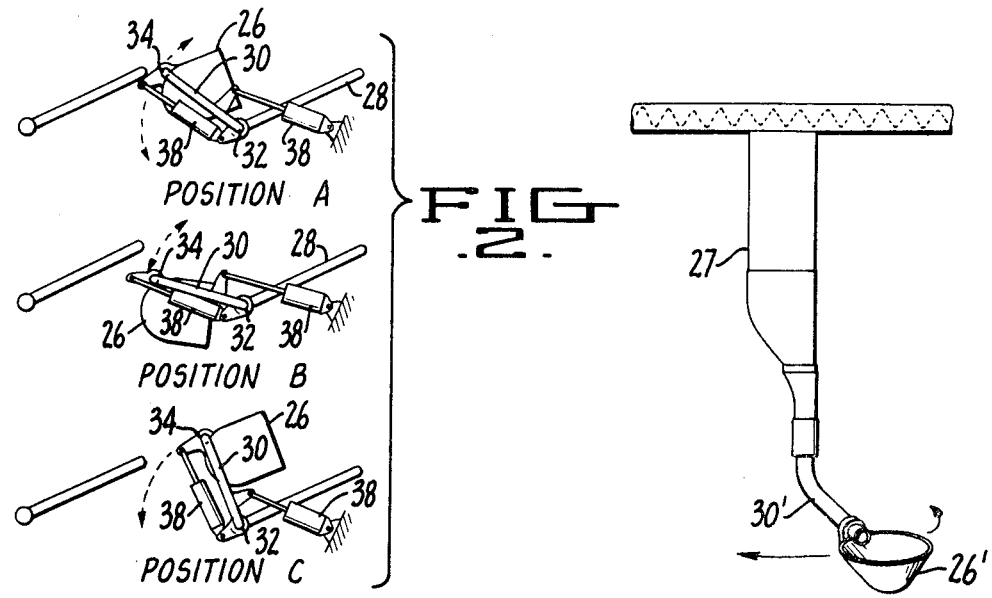
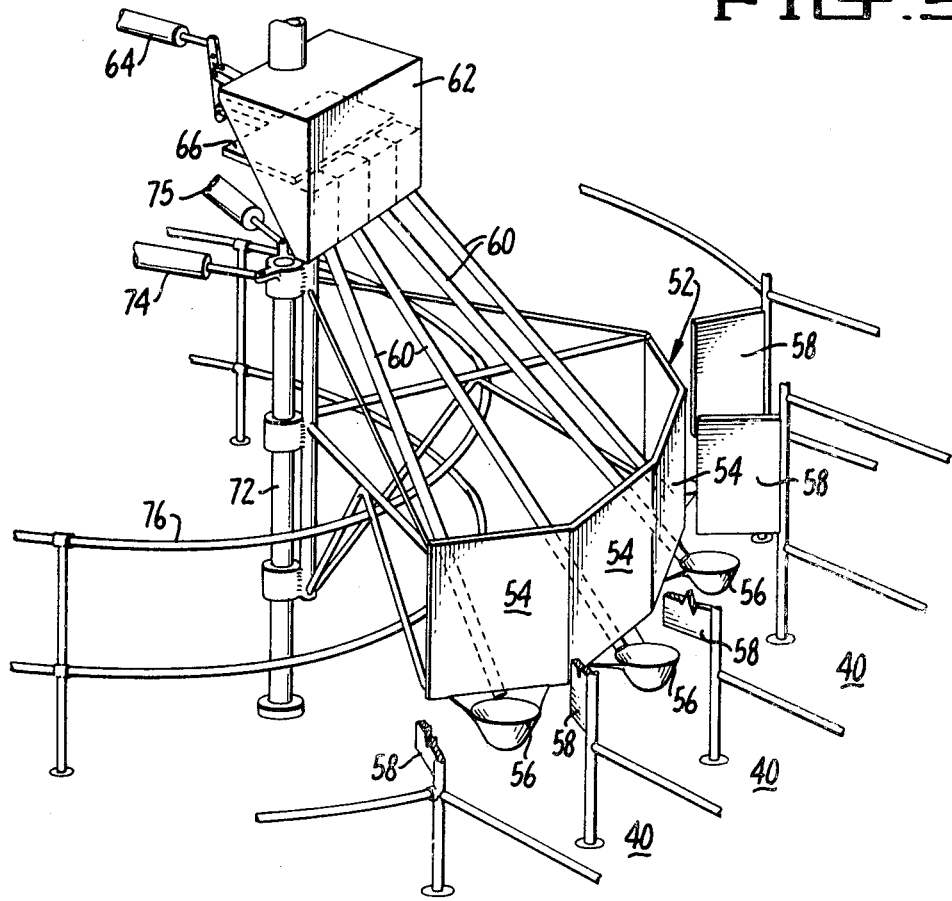

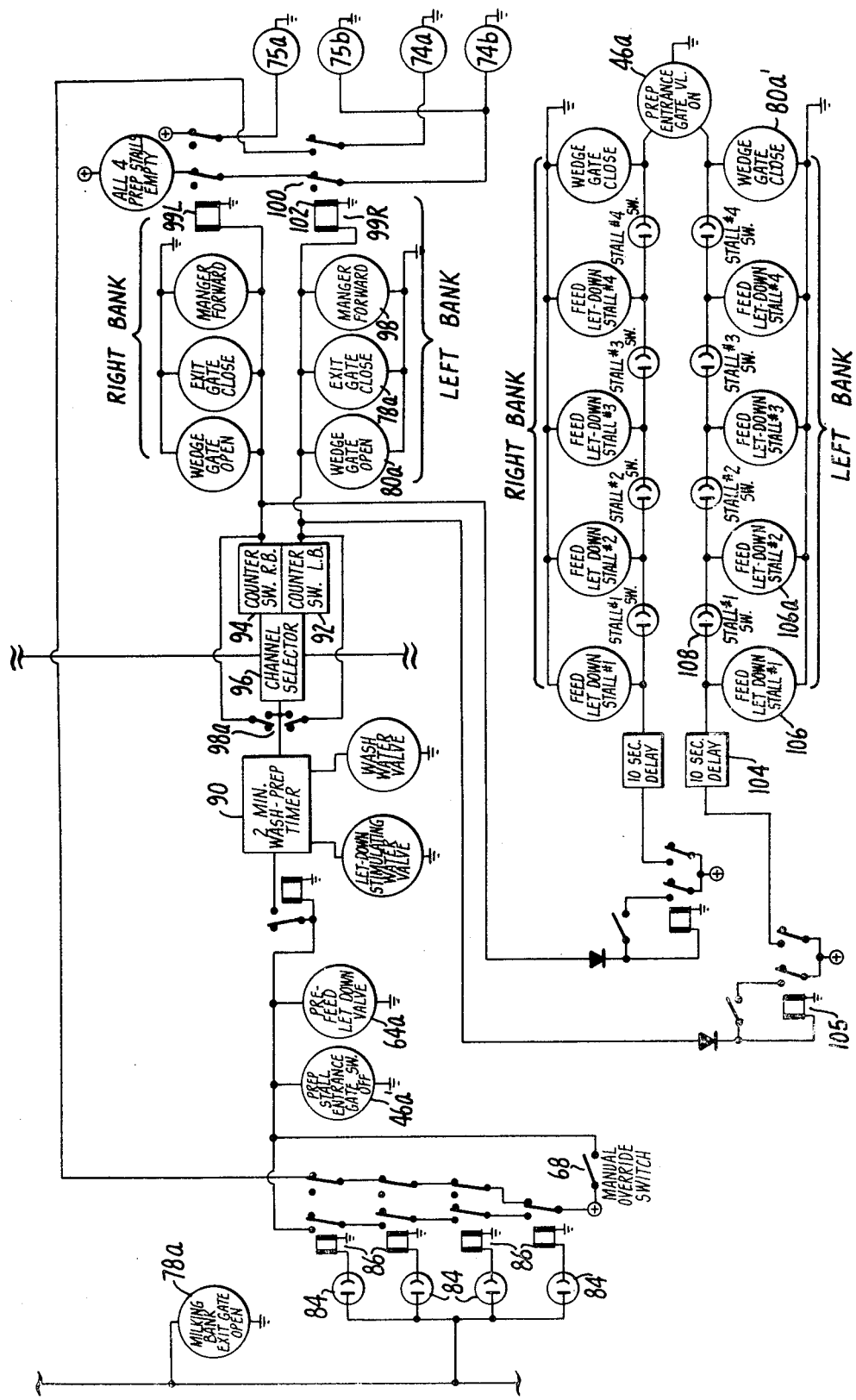

AUTOMATIC MILKING BARN

This application is a division of my copending application, Ser. No. 62,714, filed Aug. 10, 1970, now U.S. Pat. No. 3,699,922, which in turn was a continuation of copending application, Ser. No. 730,818, filed May 21, 1968, now abandoned.

This invention relates to improvements in automatic milking barns whereby a large herd of cows can be automatically prepared and milked in small groups of a predetermined number which can be swiftly handled by a single man.

In some situations, it is desirable to prepare and milk cows in small groups rather than individually. The herringbone type of parlor is more suitable for the automated movement of groups of cows in the milking area. Here several of the disadvantages of the herringbone parlor are corrected by my novel invention. The arrangement in this invention provides an integration of fixed automatic and variable automatic equipment to optimum advantage. This arrangement permits a single operator to milk large herds without sacrificing the individual attention required at certain points in the milking procedure.

In the preferred form of my invention, the apparatus shown in my prior Holm U.S. Pat. No. 3,246,631 may be employed in the preparation stages of the presently disclosed arrangement and the apparatus shown in Clegg U.S. Pat. Nos. 2,886,000; 2,888,034; 2,949,883; and 2,966,800, may be employed in the actual operation of milking the cow.

Preparation and prefeeding is done simultaneously for all cows in a group. The actual process of preparation is automatically performed at the optimum time before milking such that the cows entering the milking banks are fully prepared for the milking claw.

Other features and advantages of this automated milking barn will become apparent from the following description read in conjunction with the attached drawings in which:

FIG. 2 is a plan view illustrating three alternative positions of the gate-manger structure indicated by the circle labeled 2—2 in FIG. 1;

FIG. 3 is a side elevational view of an alternative form of the structure shown in FIG. 2;

FIG. 4 is a side elevational view of the swinging gate illustrated at 4—4 in FIG. 1; and, FIGS. 5A and 5B are a schematic wiring diagram of the controls for the apparatus of FIG. 1.

Figure 1:
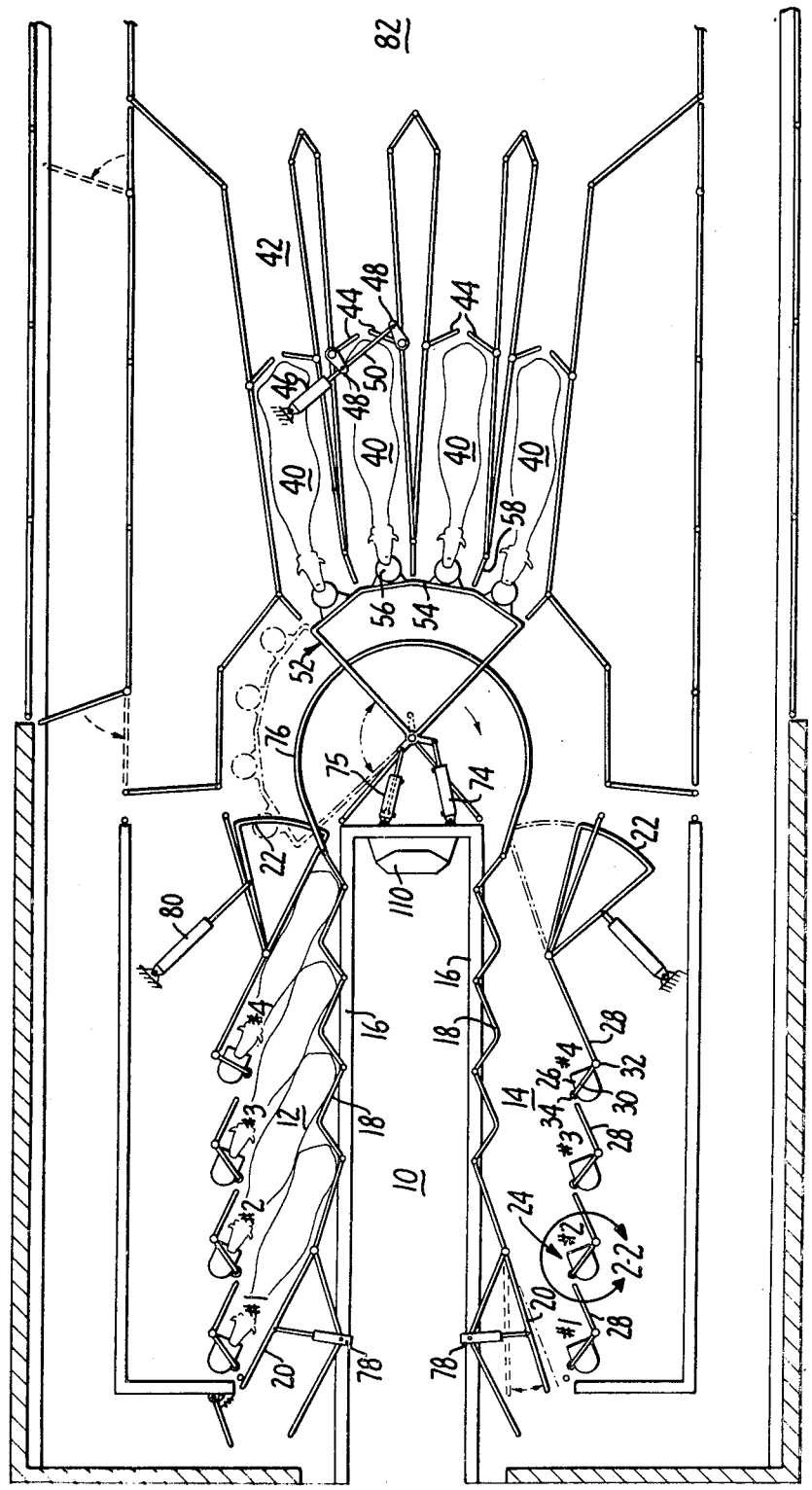
FIG. 1 is a schematic plan view of a double herringbone milking parlor constructed in accordance with the principles of this invention.

Referring now in detail to the drawings and particularly to FIG. 1, the barn illustrated has a single operator's pit 10 serving two banks 12 and 14 of milking stalls. Individual milking stalls, 1 through 4, are diagonally positioned along each side of the operator's pit 10 to form a herringbone-type milking parlor. When cows are at the milking stalls 1 to 4, their hind quarters are directed diagonally toward the operator's pit 10 enabling a single operator side access to the udders of the cows in both banks 12 and 14. A curb 16 surrounding the pit 10 prevents the cows from accidentally slipping into the pit 10.

The cows are confined in their stalls 1 to 4 by a guide fence 18 along the edge of the operator's pit 10, a milking-bank exit gate 20, which when closed aligns the cow in stall 1 to a proper milking position, a swinging wedge gate 22, which crowds the cow in stall 4 to the proper milking position, and a novel fence and manger apparatus 24 along the outer edge of the stall banks 12 and 14.

Each fence and manger structure 24 includes stationary alignment fences 28 and swinging portions 30 pivotally mounted thereon, which partially pivot about the extremity 32 of the alignment fence 28. This action is more clearly represented in FIG. 2. A manger 26 is attached to the extremity 34 of the swinging portion 30 of the fence in such a manner that it can pivot about this point of attachment. The manger 26 can be swung into feeding position, A or C, or withdrawn to a position outside the stall, B, away from the reach of the cows. When used in cooperation with the swinging portion 30 of the fence, the manger 26 can effectively adjust the length of a particular stall to suit the length of the individual cow. Since the hindquarters of the cow should be as close to the operator's pit 10 as possible for convenient access to the udder, a short cow may be crowded back by positioning the manger 26 and/or swinging portion of the fence 24 as illustrated in position C, FIG. 2. The standard feeding position before adjustment for the individual cow would be position A, FIG. 2. Both the swinging portions 30 of the fence and the mangers 26 may be controlled by small hydraulic piston systems 38 and 39, respectively, exemplified in position C, FIG. 2.

Feed is automatically dispensed in the mangers 28 on initial entry of the cows in the stalls and thereafter it is individually dispensed responsive to the quantity of milk given. Such increments may be controlled in response to the operation of the above-mentioned Clegg apparatus so that "heavy milkers" are given extra feed. Since such feeding method is known in the art, it is illustrated in the drawings only schematically.

An alternate to the swinging fence arrangement is illustrated in FIG. 3. The swinging portion 30 of the fence is replaced by a feed tube 30' that can pivot about the end of a feed hopper 27 rigidly mounted on the fence 28. The manger 26' is supported at the end of the tube 30'. The above manger embodiment functions in the same manner as the swinging fence arrangement and can effectively adjust the length of each milking stall. The mechanics of adjustment in both embodiments can be accomplished by small hydraulic piston systems 38 as illustrated in position C of FIG. 2.

Prior to entry in the milking parlor, the cows are washed and prepared in the manner described in my U.S. Pat. No. 3,246,631. In the present invention, the cows are prepared in groups rather than individually. The groups may be of any number, but it has been found that a single operator in the milking area can most conveniently handle four cows. Therefore, four preparation stalls 40 are provided in this invention to simultaneously wash and prepare four cows. The preparation stalls 40 are preferably arranged in parallel. Pre-prepartion stalls 42 may be provided in which the cows may be wahsed. As the optimum time for milking a cow after prepartion is ususally about one minute, the washing and preparation cycle does not begin until all the cows in one bank, 12 and 14, have completed milking. Cows may be prepared in the manner described in my above-mentioned patent or by an equivalent spray of warm water or air on the cow's udder to stimulate a letdown just prior to milking. The preparation of the group of cows in the four stalls 40 may also be done in a staggered sequential manner where the cows are transferred sequentially from the stalls 40 to the milking stall so that optimum preparation time is attained for each cow, the last cow to be transferred to the milking stall being stimulated to let-down somewhat later than the first cow transferred.

The entrance gates 44 to the preparation stalls 40 are operated by spring-loaded vacuum rams 46. The rams are constructed to be spring-loaded toward a gate closing position and operated by hydraulics to open the gates. The two entrance gates 44 to each preparation stall are interconnected by crank arms 48 and a link 50, and the vacuum ram 46 is connected to one of the crank arms 48 for opening the gates 44.

The preparation stall exit is blocked by a combination swing fence and prefeed amount. This swinging frame sector 52, also illustrated in FIG. 4, has a front shield 54 forming an arc of approximately 90° for four preparation stalls. Mounted at the base of the front shield 54 at a position in front of each preparation stall 40 is a feed bowl 56.

A shield 58 projects forwardly from the preparation stalls 40 at the prefeed end above the bowls 56 such that a cow will not tend to follow the bowl 56 after it passes under the shield 58. Feed is automatically dispensed into each bowl via a feed chute 60 from a feed hopper 62 mounted high on the frame sector 52. Feed is dispensed to the four bowls 56 by a single vacuum cylinder 64 operating four interconnected slide stokers 66 which dispense an amount of feed in relation to the length of stroke of the slide stokers 66. The feed dispenser may, of course, be modified by having each slide stoker 66 individually operated by its own vacuum cylinder and manual override controls may be provided to deenergize one cylinder when a corresponding stall is empty.

The frame sector 52 slowly swings about a pivot post 72 when it is necessary for the cows to leave the preparation stalls 40 and enter a bank, 12 or 14 of the herringbone milking parlor. Each preparation stall 40 is thereby opened in succession permitting the cows to singly enter the vacant bank 12 or 14 of milking stalls. The direction of swing is automatically regulated by a singal received from the emptying bank of milking stalls.

The frame sector 52 operated by hydraulic rams 74 and 75, swings approximately 90° away from the milking bank that is empty, pauses until all preparation stalls 40 are empty and then swings back to "home" position. The sector frame may thereafter be rotated an additional 90° in the reverse direction crowding the cows into the bank that had previously been empty and then returns to its "home" position in front of the prep stalls, completing a full cycle.

A stationary restraining fence 76 may be placed around the pivot post 72 to create a narrow passageway from the preparation stalls 40 to the open milking bank 12 or 14, so that the cows leaving the preparation stalls 40 must move in single file.

The milking bank exit gates 20 and swinging wedge gates 22 are each operated by a vacuum ram, 78 and 80, similar to the vacuum ram 46 used in the preparation stalls 40.

The vacuum rams 46, 78 and 80 are operated by solenoid valves (indicated by corresponding numerals and the letter "a" in FIG. 5) by which each ram is operated to open its gate when an electric current operates a solenoid valve connecting the ram to a source of vacuum. The swinging frame sector 52 is controlled by rams 74 and 75 which will swing frame 52 in the manner described above. The rams 74 and 75 are controlled by solenoid valves 74a and 74b and 75a and 75b with valves 74a and 75a causing the rams to expand and valves 74b and 75b causing the rams to contract.

Figure 5A:
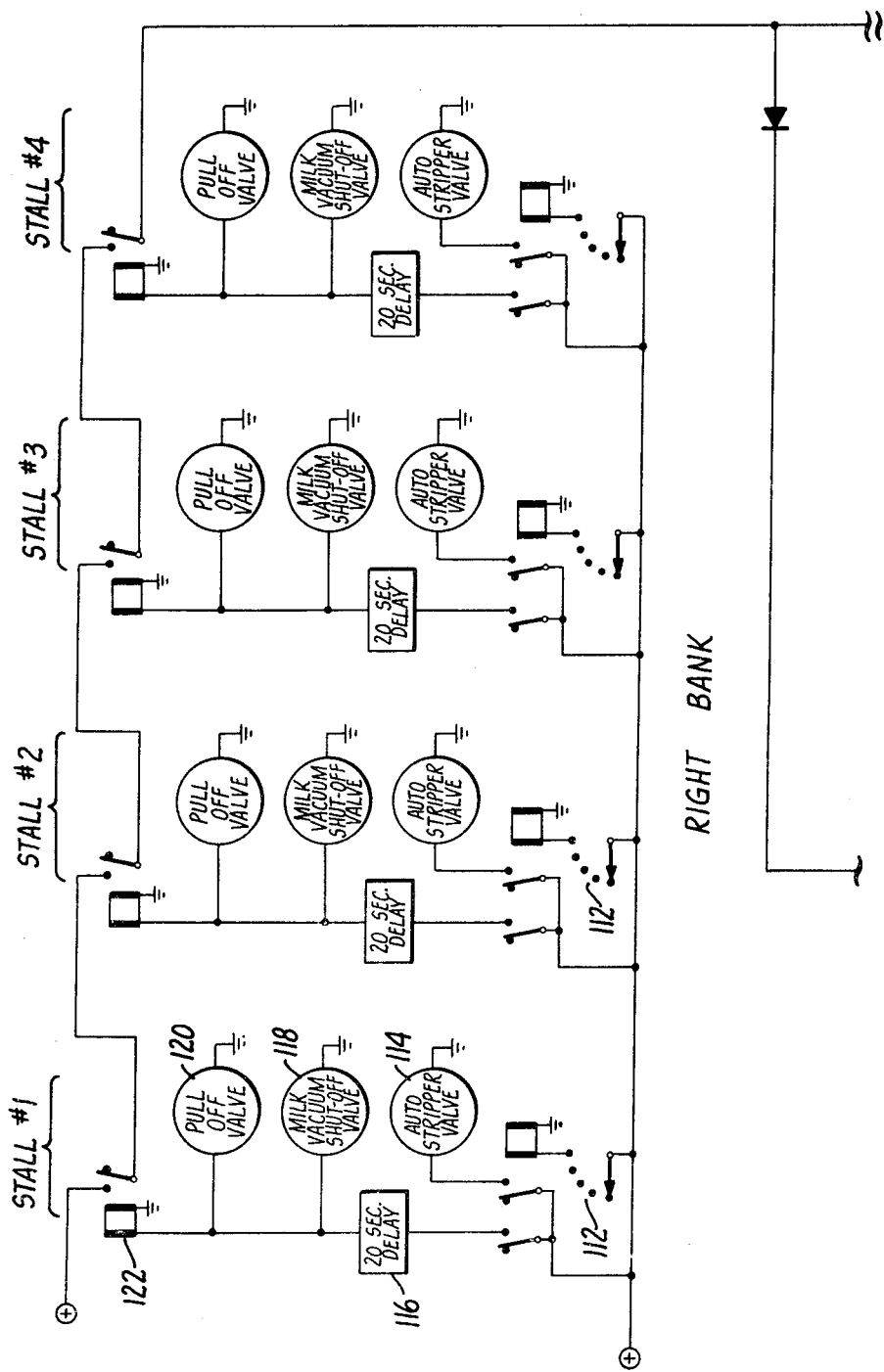

Turning more specifically to the schematic diagram of FIG. 5, the electrical operation can be described most efficiently by following the milking cycle for a group of cows. It must be noted that the cycle is not continuous, but broken. The single operator continues each cycle by placing the milking claws of the above-mentioned Clegg apparatus on the cow's teats. This step is not automated as it is desirable to permit the operator to inspect the cow's udder, dry and prime each teat, and manually place the milking claw on the cow.

In the dead position prior to the milking period, the entrance gates 44 to the preparation stalls would be closed and the frame sector 52 would be in the "home" position in front of the preparation stall exits. Thus, on activating the system, the entrance gates 44 to the preparation stalls are opened by activation of the solenoid valves 46a for the vacuum rams 46. Cows from a corral area 82 or washing stalls 42 enter the preparation stalls 40. Each of the preparation stalls has an electrical sensing switch 84 near the exit to the stall. These switches 84 may take any suitable form for sensing the presence and/or absence of a cow in the stall. Here these switches are indicated as photoelectric cells, but they may be replaced by switches operated by wands which project into the stall, or by treadles on the floor of the stall which open switches when a cow walks into the stall.

Each of the sensing switches 84 operates a relay 86 to a circuit which is not completed until all four sensing switches 84 have thrown their respective relays 86. It is apparent that only when all four preparation stalls 40 are filled, will the next circuit be complete to activate the next step. Since there will occasionally be times when less than all preparation stalls 40 are filled, such as when the last group in a herd has less than four cows, a manual override switch 68 will complete the circuit to begin the preparation cycle. When the four preparation stalls 40 are filled or the override switch 68 is thrown, the entrance gates 44 to the preparation stalls close when the solenoid valves 46a are shut by deactivator 46a'. Also, at this time, the prefeed let-down valve 64a is activated to operate ram 64 and discharge a predetermined amount of feed into the feed bowls 56, and a 2 minute wash and prep timer 90 is activated to begin the preparation of the cow for milking as described in my U.S. Pat. No. 3,246,631. Both the preparation washing and the preparation letdown stimulation may be done in the preparation stalls 40, dispensing with a separate stall for each operation. Completeion of the two minute timer cycle causes an electrical signal to be sent to the counter switches 92 and 94. The counter switches 92 and 94 close a circuit when four cows have left a bank 12 or 14. A channel selector 96 is used in combination with the counter switches 92 and 94 such that when both banks are empty the first to empty will be the first to fill and the counter switch for the other bank will hold until a second group of cows has finished in the preparation stalls 40 and is ready to enter the milking banks 12 and 14. It may be necessary to have manual override switches 98a to activate this step in the milking operation if in the previous herd the last group to be milked contained fewer than four cows. When the counter switch 92 closes the circuit in, for example, the left bank 14, the signal developed from the 2 minute timer 90 activates the following: a wedge gate solenoid valve 80a, opening the entrance to the left bank; an exit gate solenoid valve 78a, simultaneously closing the exit gate 20 to the milking bank 14, a manger solenoid valve 98, hydraulically moving the mangers 26 into feeding position, relay 99 controlling the swinging of the frame sector 52 to the right.

The swinging of the frame sector 52 must be considered in detail. In our example, the left bank 14 is open. The frame sector 52, therefore, first slowly swings to the right allowing the cows in each of the preparation stalls 40 to be released separately. This swinging is caused by expansion of ram 74 with valve 74a open and valves 74b and 75a and 74b vented. The frame swings approximately 90° until it hits a mechanical stop. As soon as one of the prep stalls 40 empties, one of the relays 86 opens removing power from the relay 99, and the sector frame 52 remains in its position until all of the relays 86 open. At this point, both of the valves 74b and 75b are opened (74a and 75a vented) to cause both rams 75 to contract until the gate reaches a centered "home" position with rams 74 and 75 exerting balanced torque on the sector frame 52.

Additionally, a 10 second delay timer 104 is activated through relay 105 after ten seconds, permitting feed to be dispensed to the manger 26 in stall 1 of the left bank by activating the feed let-down valve 106 for stall 1. The delay is to insure that the mangers 26 are in place when the feed is let down. Feed is supplied by apparatus similar to that in FIG. 4, but with each manger individually supplied. The initial allotment is automatic, additional feed is supplied to the cow in relation to the weight of milk given as described above. Since the cows must be positioned in individual stalls when they enter the bank 14, it is desirable that the first cow entering, not stop at the closest manger to feed, but proceed to stall 1. Therefore, feed is dispensed to stall 1 first. When a cow positions herself in stall 1, an electrical sensing switch 108, similar to the sensing switches 84 employed in the preparation stalls 40, closes causing the feed let-down valve 106a for stall 2 to be activated. This procedure continues until all mangers have feed. The last sensing switch 108 in stall 4 deactivates the solenoid valve 80a' to the wedge gate, closing the gate 80 and crowding the cow in stall 4 into a milking position. Relay 105 is held selfenergized until a limit switch on gate 22 opens when the gate closes. This sensing switch 108 also activates the solenoid valve 46a to open the entrance gates 44 to the preparation stalls 40 to receive another group of cows. A separate circuit (not shown) individually controls the position of each manger 26 for long or short cows as previously described and is operated from a control console 110 in the operator's pit 10. In some situations, a single control is used to operate all four feed dispensing devices for the four stalls of one bank simultaneously with closing of the wedge gate 22. This arrangement simplifies the controls substnatially, but does not have the advantage of urging the cows into milking position with waiting feed.

It is at this point in the cycle that the cows are given individual attention by the operator. After inspection and priming, the milking claw is placed on the cow which again begins the automated cycle.

In our example, we followed the first group in a herd through the milking cycle. When both milking banks 12 and 14 are filled, the cows in the preparation stalls 40 must await completion of the milking on one of the banks before the preparation cycle will begin.

In a maximum automated barn, the cows are automatically stripped by a modification to the Clegg apparatus described in my U.S. Pat. No. 3,246,631. After the cow stops giving milk, which is indicated by a pulse counter 112, thhe auto-stripper valve 114 for that cow is activated. After a twenty second delay provided by a timer 116, a milking vacuum shut-off valve 118 and a pull-off valve 120 are operated. In addition, the signal from the timer 116 closes a relay switch 122 for that stall. When all four relay switches 122 in a bank are closed a circuit is completed sending a signal to the solenoid valve 78a of the milking bank exit gate and to the sensing switches 84 of the preparation stalls. If all four preparation stalls 40 are filled, a preparation cycle will begin. Additionally, the signal from relays 122 is connected to channel selector 96 so that subsequent energization of the sector gate causes the sector gate to rotate in the proper direction.

The preparation cycle will therefore not begin until cows are about to leave one of the milking banks 12 or 14. Since a preparation cycle takes one to two minutes, there is adequate time for the cows that have completed their milking cycle to leave the milking bank before the cows in the preparation stalls are ready to enter.

Although the signal to the sensing switches 84 to begin a preparation cycle could be sent by the counter switch circuit when all cows have left the milking bank, 12 or 14, the preferred method previously described provides a full utilization of the barn and somewhat shortens the cow's stay in the preparation stalls 40.

In many areas of the control system it is desirable to provide manual override switches located on the console 110 in order that the operator can quickly adjust the systems for any irregularity that may develop. For simplicity of illustration, however, these override switches are not illustrated.

I have illustrated and described herein one specific arrangement for employing my invention in a herringbone milking parlor. Obviously, many variations may be made in the structures shown and the controls shown for those structures. The specific arrangement illustrated above is intended merely as one example, and is not intended as any limitation on the scope of the invention as more broadly defined in the following claims.

I claim:

1. In a milking barn having a plurality of milking stalls in which a plurality of cows can be milked and having a plurality of preparation stalls in which a plurality of cows can be prepared for milking having adjacent exits, the improvement comprising a movable frame disposable in blocking relation to the exits of said preparation stalls and movable successively past such exits to allow the cows to leave said preparation stalls in succession for entry to said milking stalls.

2. The apparatus of claim 1, said frame having a wall thereon projecting away from said preparation stalls whereby cows leaving the preparation stalls cannot move in the direction of movement of the frame.

3. The apparatus of claim 2 having power means for moving said frame in both directions past the exits of said preparation stall whereby the wall controls the direction of cow exit from the preparation stalls and crowds cows away from the preparation stalls.

4. The apparatus of claim 3 in which said frame is mounted on pivot post for rotating movement.

5. The apparatus of claim 2 including a stationary fence on the opposite side of said frame from the exits for defining a passageway with the frame with the wall on the frame extending across the passageway.

* * * * *